US007095516B2

(12) United States Patent
Yamashita et al.

(10) Patent No.: US 7,095,516 B2
(45) Date of Patent: Aug. 22, 2006

(54) PRINTING APPARATUS

(75) Inventors: Masayuki Yamashita, Osaka (JP); Eiichi Saito, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 779 days.

(21) Appl. No.: 10/354,320

(22) Filed: Jan. 30, 2003

(65) Prior Publication Data

US 2003/0147094 A1 Aug. 7, 2003

(30) Foreign Application Priority Data

Jan. 31, 2002 (JP) ........................... P2002-023056

(51) Int. Cl.
*G06K 15/00* (2006.01)
*H04N 1/00* (2006.01)

(52) U.S. Cl. ..................................... 358/1.14; 358/437

(58) Field of Classification Search ........ 358/1.1–1.18, 358/437, 403, 401, 426.02, 426.05, 426.06
See application file for complete search history.

(56) References Cited

FOREIGN PATENT DOCUMENTS

JP 11312062 A * 11/1999
JP 2000006476 * 1/2000
JP 2000181656 A * 6/2000

* cited by examiner

*Primary Examiner*—Douglas Q. Tran
(74) *Attorney, Agent, or Firm*—RatnerPrestia

(57) ABSTRACT

A printing apparatus includes a recording medium for recording image data and recording medium information, a recording medium read-out device, a print control device for giving a print command for printing the image data, a recording device for recording the recording medium information of the recording medium and information on automatic print records and a comparator. When the print control device has detected that a battery for a power source will run down during printing, the comparator detects, after turning on of the power source again, that the recording medium information of the recording device is coincident with that of the recording medium and then, the print control device gives a further print command for continuously printing, in accordance with the information on the automatic print records recorded in the recording device, the image data designated by the print command given prior to turning on of the power source again.

14 Claims, 5 Drawing Sheets

*Fig.4*

19
```
[JOB]
PRT PID=001
PRT TYP=STD
PRT QTY = 1
IMG FMT=EXIF2 -J
<IMG SRC="../DCIM/100CDPFP/IMGA0001.JPG">
```

20
```
[JOB]
PRT PID=002
PRT TYP=STD
PRT QTY = 1
IMG FMT=EXIF2 -J
<IMG SRC="../DCIM/100CDPFP/IMGA0002.JPG">
```

21
```
[JOB]
PRT PID=002
PRT TYP=STD
PRT QTY = 3
IMG FMT=EXIF2 -J
<IMG SRC="../DCIM/100CDPFP/IMGA0003.JPG">
```

22
```
[JOB]
PRT PID=002
PRT TYP=STD
PRT QTY = 1
IMG FMT=EXIF2 -J
<IMG SRC="../DCIM/100CDPFP/IMGA0004.JPG">
```

PRINTING APPARATUS

BACKGROUND OF THE INVENTION

1. Field of the Invention

The present invention relates to a printing apparatus for automatically printing image data shot by a photographic device such as a digital still camera and a digital video camera and recorded in a recording medium.

2. Description of the Prior Art

In recent years, the market is expanding for imaging devices such as a digital still camera and a digital video camera, which are capable of recording a high-quality digital still image on a nonvolatile memory card. Meanwhile, demands and applications for not only viewing on a television monitor or a personal computer but converting to a hard-copy print the digital still image recorded in the digital still camera and the digital video camera are increasing. Under such circumstances, many printing apparatuses employing various printing types such as a sublimation type, a heat transfer type and an ink jet type, which read digital still images from a memory card so as to record the digital still images on a recording paper sheet are put on the market.

In accordance with automatic print setting files for setting desired digital still images to be printed and print quantities of the desired still images, which are formulated in the memory card, these known printing apparatuses automatically print the desired digital still images in order to print the desired digital still images easily. Alternatively, some of the known printing apparatuses may have an automatic print function of automatically printing, in case the automatic print setting files are not formulated in the memory card, all the digital still images recorded in the memory card.

FIG. 5 shows a conventional printing apparatus. The conventional printing apparatus includes a memory card 1, a memory card control unit 2 for performing read-write of the memory card 1, a power source 3, an image memory 6 for storing image data recorded in the memory card 1 and a control unit 4 for controlling recording of digital still images in the image memory 6 and controlling automatic print so as to continue or stop the automatic print by judging whether or not a detected remainder of a battery capacity enables printing. The conventional printing apparatus further includes an operating unit 5, a print engine 7 for printing the data of the image memory 6 and a thermal head 8.

FIG. 3 shows one example of a configuration of a directory recorded in the memory card 1. The directory includes digital still images 13 to 18 and folders 11 and 12 for storing the digital still images 13 to 18. Meanwhile, FIG. 4 shows one example of automatic print setting files 19 to 22 recorded in the memory card 1. The automatic print setting files 19 to 22 correspond to the digital still images 13 to 16, respectively. In the automatic print setting files 19 to 22, the descriptions "PRT PID=001" and "PRT PID=002" denote JOB numbers, while the description "PRT PID=STD" denotes output of one digital still image to one recording paper sheet. Meanwhile, the descriptions "PRT QTY=1" and "PRT QTY=3" denote a print quantity of one sheet and a print quantity of three sheets, respectively, while the description "IMG FMT=EXIF2-J" designates a recording format of the images. Furthermore, the description <IMG SRC="../DCIM/100CDPFP/IMGA0001.JPG"> of the automatic print setting file 19 designates the digital still image 13, the description <IMG SRC="../DCIM/100CDPFP/IMGA0002.JPG"> of the automatic print setting file 20 designates the digital still image 14, the description <IMG SRC="../DCIM/100CDPFP/IMGA0003.JPG"> of the automatic print setting file 21 designates the digital still image 15 and the description <IMG SRC="../DCIM/100CDPFP/IMGA0004.JPG"> of the automatic print setting file 22 designates the digital still image 16.

Hereinafter, operation of the conventional printing apparatus is described with reference to FIGS. 3 to 5. By operating the operating unit 5 so as to turn on the power source 3, the control unit 4 delivers to the power source 3 a command for turning on the power source 3. When an AC adapter is connected to the power source 3, power is supplied to the power source 3 from the AC adapter. When only a battery is connected to the power source 3, power is supplied to the power source 3 from the battery. Subsequently, the control unit 4 detects whether or not the memory card 1 in which the automatic print setting files and the digital still images are recorded is connected to the memory card control unit 2. If the control unit 4 has detected that the memory card 1 is connected to the memory card control unit 2, the memory card control unit 2 reads the memory card 1 and the control unit 4 judges whether or not the automatic print setting files 19 to 22 are recorded in the memory card 1. In case the control unit 4 has judged that the automatic print setting files 19 to 22 are recorded in the memory card 1, the control unit 4 reads from the memory card 1 data of the digital still image 13 designated by the automatic print setting file 19 and expands the data of the digital still image 13 into image information so as to store the image information in the image memory 6. Upon delivery of a print command from the control unit 4 to the print engine 7, the print engine 7 supplies the image information of the image memory 6 to the thermal head 8 through pulse signals such that the digital still image 13 is printed on one sheet in accordance with the description "PRT QTY=1" in the automatic print setting file 19. Thereafter, automatic print of the digital still images 14 to 16 is likewise performed in accordance with the automatic print setting files 20 to 22, respectively. Thus, the automatic print of the digital still images 13 to 16 is completed.

On the other hand, in case the control unit 4 has judged that the automatic print setting files 19 to 22 are not recorded in the memory card 1, the conventional printing apparatus outputs one print of the digital still images 13 to 18. Alternatively, if the conventional printing apparatus has a function of setting a plurality of prints by a print quantity setting menu or the like, the conventional printing apparatus may output a plurality of prints of each of the digital still images 13 to 18.

However, in the conventional printing apparatus, automatic print in which power is supplied to the power source 3 from the battery might be interrupted in a run-down state of the battery. In such a case, even if print can be performed subsequently by connecting the recharged battery or the AC adapter to the power source 3, the automatic print cannot be resumed subsequently to a printing stage attained at the time of interruption of the automatic print. Therefore, an operator of the conventional printing apparatus should confirm up to which printing stage the automatic print has been completed. In case set data of completed printing has been erased from the automatic print setting files or print quantities have been set, the operator has to confirm that the set print quantities and the completed print quantities are correct. If the set print quantities and the completed print quantities are not correct, the operator should perform resetting of the automatic print setting files by resetting the print quantities, etc.

Meanwhile, in case the automatic print has been interrupted when the automatic print setting files are not recorded in the memory card, some of the digital still images, whose printing has been completed, should be erased from the memory card.

Therefore, in case the automatic print has been interrupted in the conventional printing apparatus, such a problem as very poor operating efficiency arises due to the necessity for resetting of the automatic print setting files or erasure of the digital still images from the memory card.

In such a case, it is needless to say that the automatic print can be performed again from an initial printing stage without taking any countermeasures. However, in this case, already outputted prints become useless disadvantageously.

SUMMARY OF THE INVENTION

A printing apparatus according to the present invention includes a recording medium readout means for reading from a recording medium for recording image data to be printed, the image data. A print control means gives a print command for printing the image data recorded in the recording medium. Meanwhile, a recording means records information on automatic print records, indicative of, in the image data designated by the print command of the print control means, the number of images whose prints of quantities designated by the print command of the print control means have been outputted and the number of outputted prints of an image whose prints of a quality designated by the print command of the print control means have not been outputted. When the print control means has detected that a battery for a power source will run down during printing, the information on the automatic print records is recorded in the recording means and then, the print control means gives, after turning on of the power source again, a further print command for continuously printing, in accordance with the information on the automatic print records recorded in the recording means, the image data designated by the print command given prior to turning on of the power source again.

BRIEF DESCRIPTION OF THE DRAWINGS

Features of the present invention will become apparent from the following description taken in conjunction with the preferred embodiments thereof with reference to the accompanying drawings in which:

FIG. 4 is a view showing one example of automatic print setting files of the memory card.

Before the description of the present invention proceeds, it is to be noted that like parts are designated by like reference numerals throughout several views of the accompanying drawings.

DETAILED DESCRIPTION OF THE INVENTION

Hereinafter, embodiments of the present invention are described with reference to FIGS. 1 to 4.

First Embodiment

Figure 1:
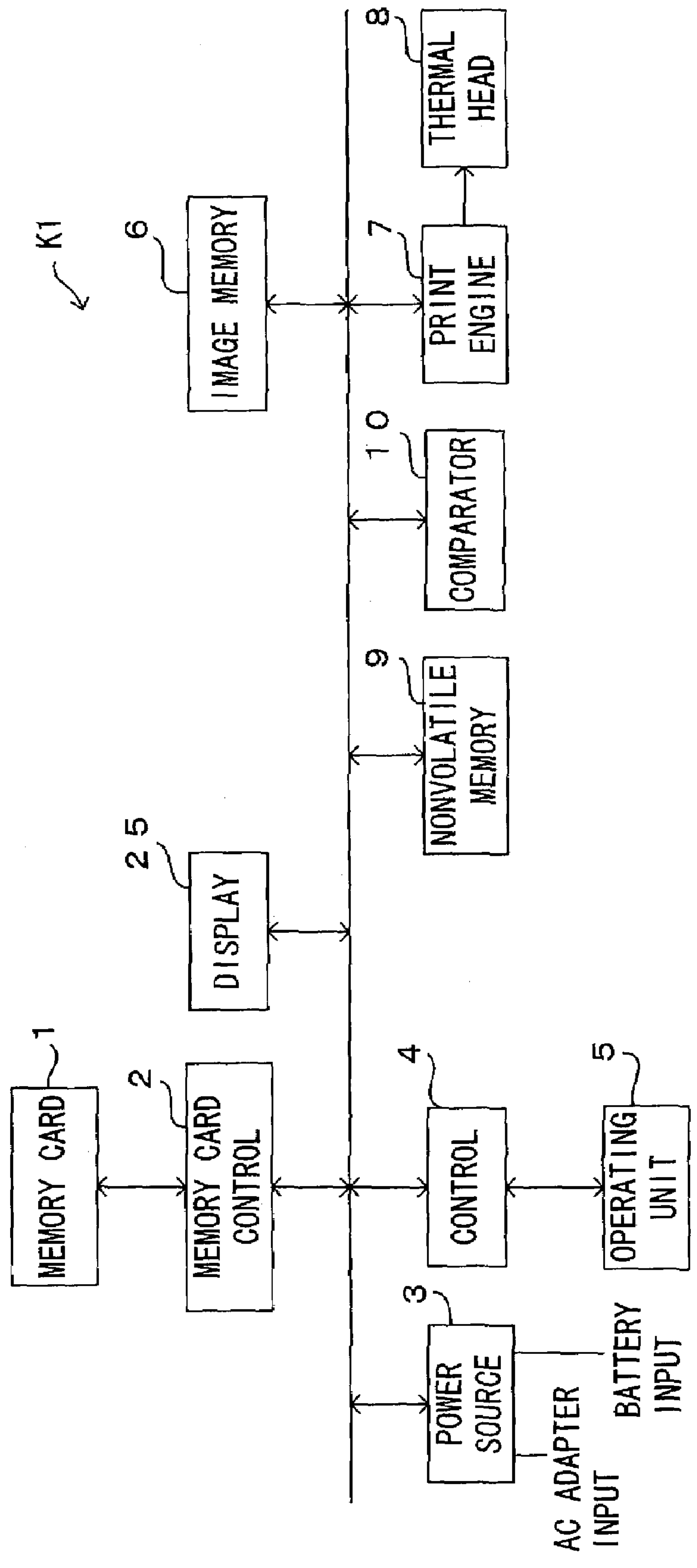
FIG. 1 is a block diagram of a printing apparatus according to a first embodiment of the present invention.
Figure 5:
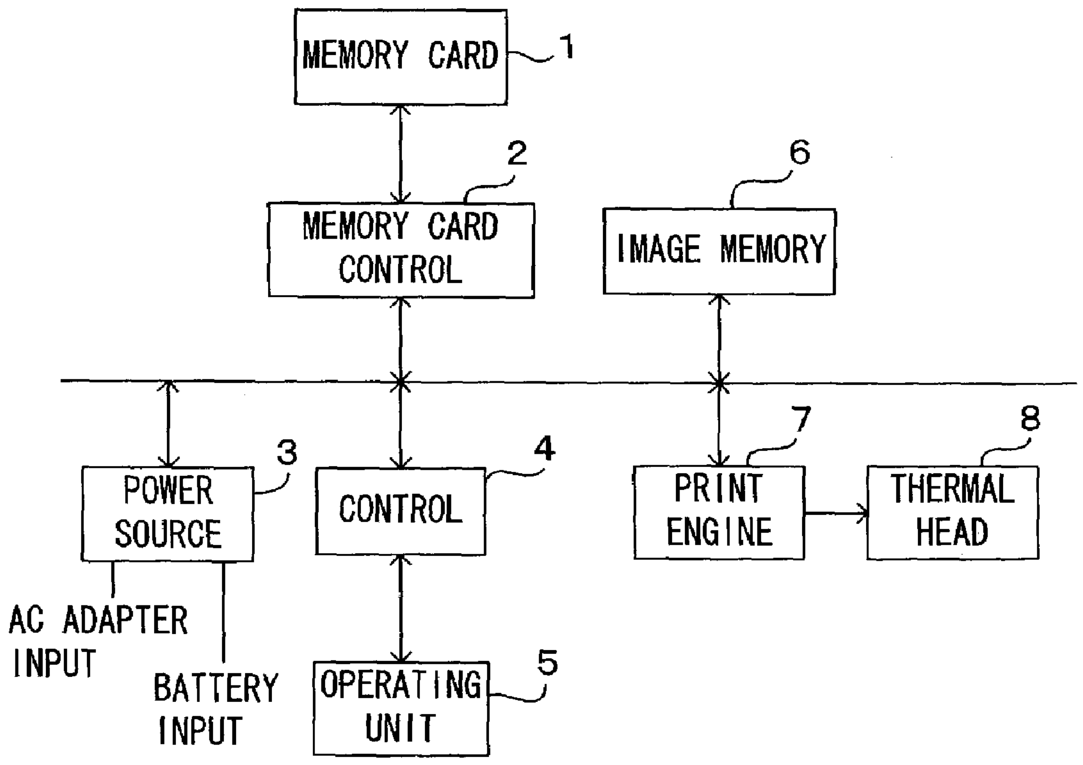
Fig.5 PRIOR ART
FIG. 5 is a block diagram of a prior art printing apparatus.

FIG. 1 is a block diagram of a printing apparatus K1 according to a first embodiment of the present invention. In the same manner as a conventional printing apparatus of FIG. 5, the printing apparatus K1 includes a memory card 1, a memory card control unit 2 for performing read-write of the memory card 1, a power source 3, an image memory 6 for storing image data recorded in the memory card 1, a control unit 4 for controlling recording of digital still images in the image memory 6 and controlling automatic print so as to continue or stop the automatic print by judging whether or not a detected remainder of a battery capacity enables printing, an operating unit 5, a print engine 7 for printing the data of the image memory 6 and a thermal head 8.

The printing apparatus K1 further includes a nonvolatile memory 9 for storing information on automatic print records and recording medium information of the memory card 1 in which image data to be subjected to the automatic print is recorded, a comparator 10 for comparing the recording medium information of the memory card 1 with the recording medium information stored in the nonvolatile memory 9 so as to detect whether or not they are coincident with each other and a display unit 25 for displaying digital still images 13 to 18 recorded in the memory card 1. The above comparison of the comparator 10 is performed for the purpose of canceling restart operation of the automatic print in case the digital still images recorded in the memory card 1 have been subjected to changes such as addition and erasure when the printing apparatus K1 is in OFF state.

Figure 3:
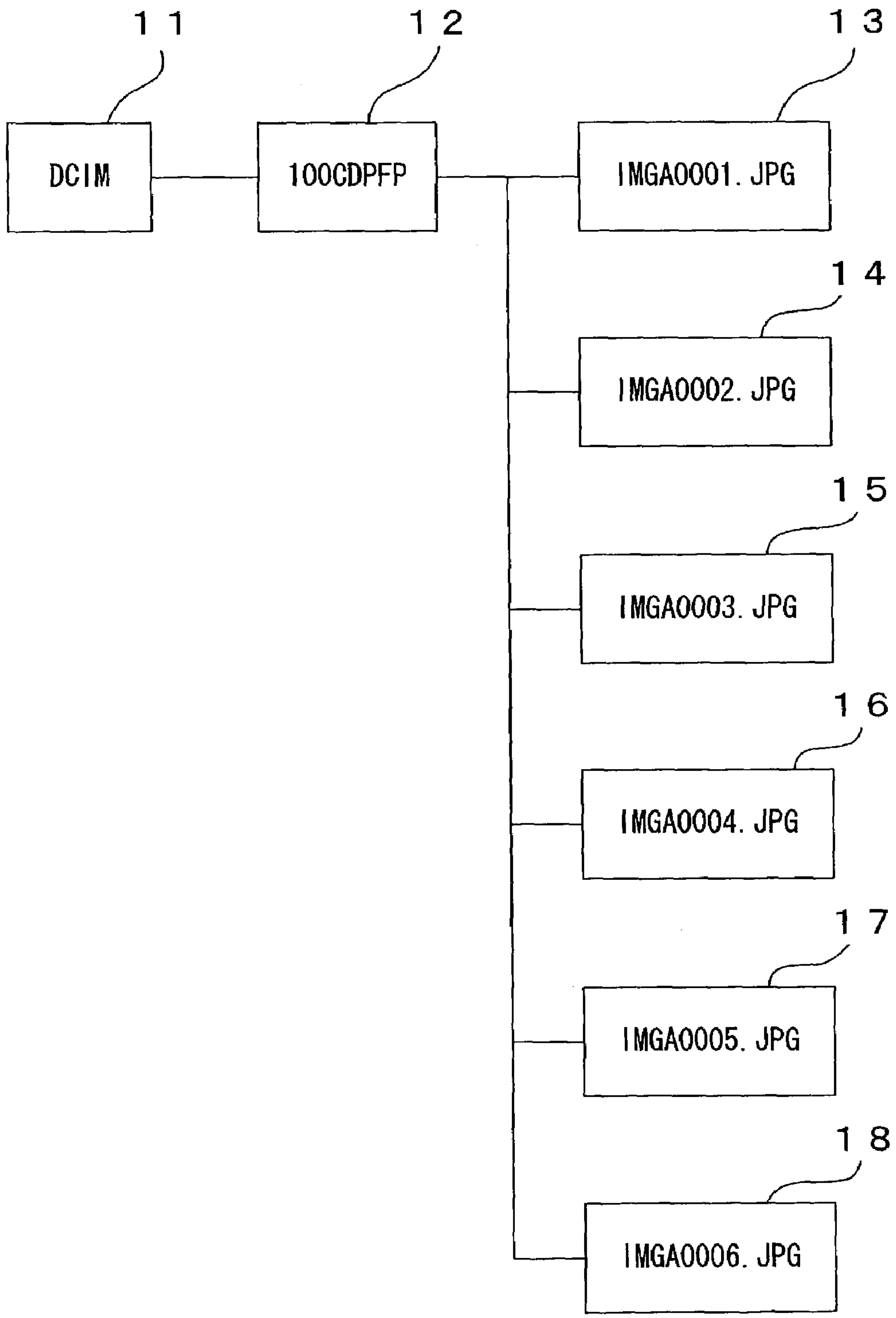
FIG. 3 is view showing one example of a configuration of a directory of a memory card.

Hereinafter, automatic print of the printing apparatus K1 is described with reference to FIGS. 1 and 3. FIG. 3 shows one example of a configuration of a directory of the memory card 1 and the directory includes the digital still images 13 to 18 and folders 11 and 12 for storing the digital still images 13 to 18. In this automatic print, power is supplied to the power source 3 from a battery, the digital still images 13 to 18 are recorded in the memory card 1 but automatic print setting files 19 to 22 of FIG. 4 are not recorded in the memory card 1. Initially, an operator operates the operating unit 5 so as to turn on the power source 3 by the battery via the control unit 4. Then, the control unit 4 detects that the memory card 1 is connected to the memory card control unit 2. In this state, the operator displays the digital still images 13 to 18 of the memory card 1 on the display unit 25 so as to select the digital still images 13 and 14 to be printed and sets, by operating the operating unit 5, the automatic print for outputting two prints of each of the digital still images 13 and 14 so as to start the automatic print. The control unit 4 detects remainder of a battery capacity each time one print of each digital still image has been outputted. During the automatic print, in case the control unit 4 has judged, by detecting the remainder of the battery capacity upon completion of output of two prints of the digital still image 13 and one print of the digital still image 14, that the remainder of the battery capacity is insufficient for outputting the remaining prints, the control unit 4 stores in the nonvolatile memory 9 the information on the automatic print records that output of the two prints of the digital still image 13 has been completed (i.e., "the number of the digital still images whose prints of the designated print quantities have been outputted=1") and output of the one print of the digital still image 14 has been completed (i.e., "the number of outputted prints of the digital still image whose prints of the designated print quantity have not been outputted=1") and the recording medium information of the memory card 1. The recording medium information of the memory card 1 includes the remaining capacity of the memory card 1, for example, "4 Mbytes", the number of the digital still images recorded in the memory card 1, for example, "6", a file name of at least one digital still image recorded in the memory card 1, for example, "IMGA0001.JPG" of the digital still image 13, information on a file size of at least one digital still image recorded in the memory card 1, for example, "700 Kbytes" and information on file sizes of the automatic print setting files 19 to 22 recorded in the memory card 1, for example, "0 byte".

Then, the control unit 4 turns off the power source 3. Subsequently, when the printing apparatus K1 has been reinstated to a state enabling printing by turning on the power source 3 by an AC adapter or the recharged battery, the comparator 10 compares the recording medium information of the memory card 1 with the recording medium information stored in the nonvolatile memory 9 so as to detect whether or not they are coincident with each other.

In case the recording medium information of the memory card 1 is coincident with the recording medium information recorded in the nonvolatile memory 9, it is judged from the information on the automatic print records of "the number of the digital still images whose prints of the designated print quantities have been outputted=1" and "the number of outputted prints of the digital still image whose prints of the designated print quantity have not been outputted=1" that output of two prints of the digital still images 13 has been completed and output of one print of the digital still image 14 has been completed. Hence, in response to a command for outputting the remaining one print of the digital still image 14, the memory card control unit 2 reads the digital still image 14 from the memory card 1 so as to expand the digital still image 14 into image information and the control unit 4 stores the image information in the image memory 6. Then, the print engine 7 supplies to the thermal head 8 the image information stored in the image memory 6 and one print of the digital still image 14 is outputted by the thermal head 8. Thus, output of the two prints of each of the digital still images 13 and 14 has been completed.

On the other hand, in case the recording medium information of the memory card 1 is not coincident with the recording medium information recorded in the nonvolatile memory 9, the operator operates the operating unit 5 so as to give to the control unit 4 a first command for outputting two prints of the digital still image 13 and a second command for outputting two prints of the digital still image 14. In response to the first command, the memory card control unit 2 reads the digital still image 13 from the memory card 1 so as to expand the digital still image 13 into image information and the control unit 4 stores the image information in the image memory 6. Then, the print engine 7 supplies to the thermal head 8 the image information stored in the image memory 6 and one print of the digital still image 13 is outputted by the thermal head 8. Subsequently, if the control unit 4 has detected that remainder of a battery capacity enables printing, the control unit 4 confirms whether or not the designated two prints of the digital still image 13 have been outputted. Since only one print of the digital still images 13 has been outputted, the above described printing procedures for the initial one print of the digital still image 13 are performed for the remaining one print of the digital still image 13. Then, in response to the second command, the memory card control unit 2 reads the digital still image 14 from the memory card 1 so as to expand the digital still image 14 into image information such that the designated two prints of the digital still image 14 are outputted in the same manner as the digital still image 13. Thus, output of the two prints of each of the digital still images 13 and 14 has been completed.

Thereafter, in the nonvolatile memory 9, the recording medium information and the information on the automatic print records are cleared. Consequently, the print output commands of the operating unit 5 have been executed and the operating unit 5 is set in a waiting state.

In the first embodiment, the following effects can be gained. Namely, in the printing apparatus K1 in which the digital still images to be printed are selected by displaying on the display unit 25 the digital still images recorded in the memory card 1, if power is supplied to the power source 3 from the battery and the control unit 4 has detected that the battery will run down during printing, the information on the automatic print records and the recording medium information of the memory card 1 are recorded in the nonvolatile memory 9 and then, the power source 3 is turned off. Therefore, if it is detected, after the power source 3 has been turned on again, whether or not the recording medium information of the memory card 1 recorded in the nonvolatile memory 9 is coincident with the recording medium information of the memory card 1 read by the memory card control unit 2 after turning on of the power source 3 again, it is possible to confirm whether or not contents of the memory card 1 prior to turning on of the power source 3 again are identical with those after turning on of the power source 3 again. Furthermore, by using the information on the automatic print records recorded in the nonvolatile memory 9, the printing operation is continued from the digital still image selected immediately prior to turning off of the power source 3, without the need for performing special operations. Meanwhile, when the control unit 4 has detected that the battery will run down during printing, the information on the automatic print records and the recording medium information of the memory card 1 are recorded in the nonvolatile memory 9 and then, the power source 3 is turned off, so that it is possible to positively inform the operator of a risk that the battery will run down. Consequently, desired automatic print can be performed positively by preventing erroneous automatic print.

Second Embodiment

Figure 2:
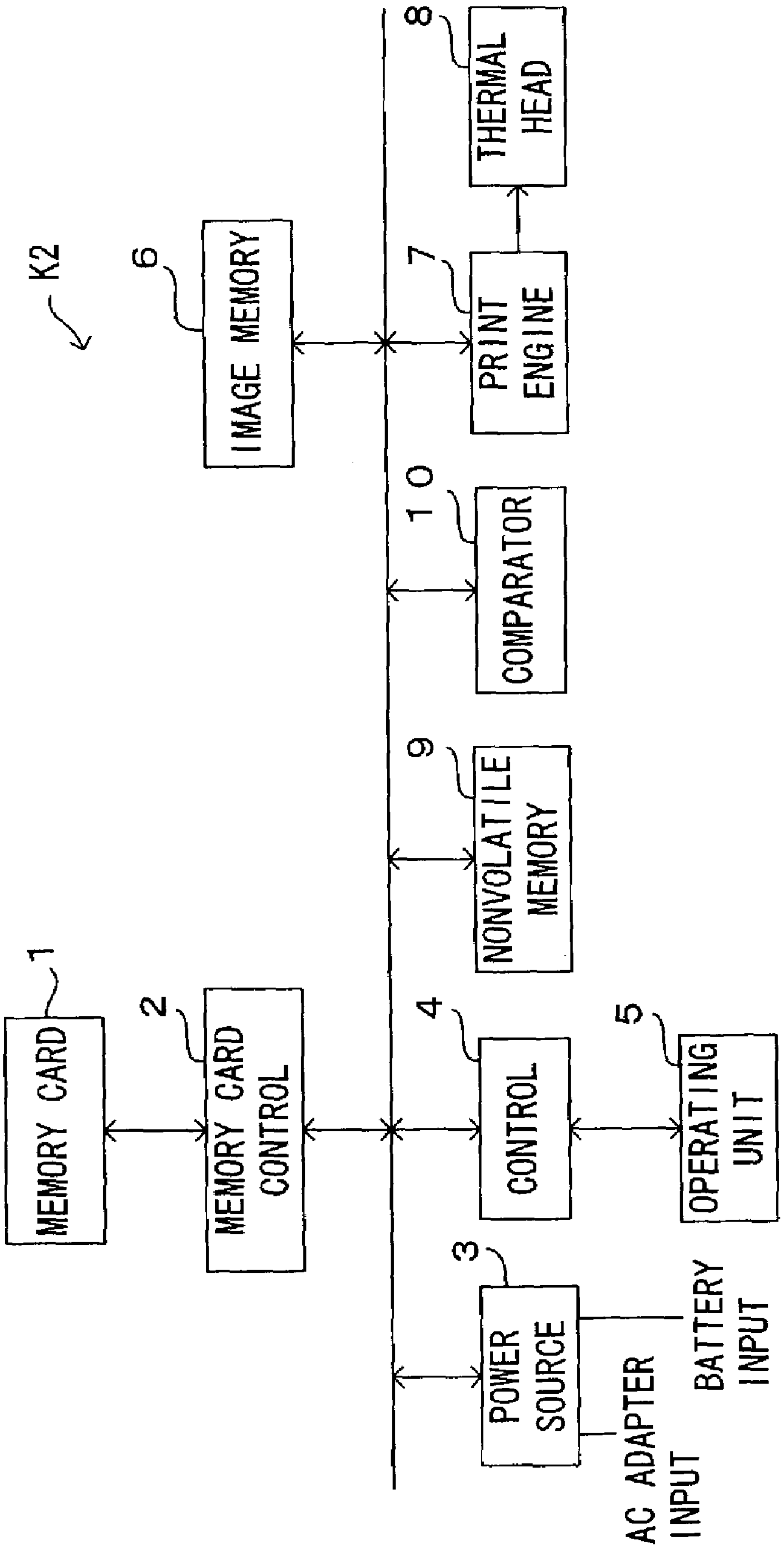
FIG. 2 is a block diagram of a printing apparatus according to a second embodiment of the present invention.

FIG. 2 shows a printing apparatus K2 according to a second embodiment of the present invention. The display unit 25 of the printing apparatus K1 is eliminated from the printing apparatus K2. Since other constructions of the printing apparatus K2 are similar to those of the printing apparatus K1, the description is abbreviated for the sake of brevity. As described below sequentially, automatic print of the printing apparatus K2 has first, second and third modes.

Hereinafter, the first mode of the automatic print of the printing apparatus K2 is described with reference to FIGS. 2 to 4. FIG. 4 shows one example of the automatic print setting files 19 to 22 recorded in the memory card 1. The automatic print setting files 19 to 22 correspond to the digital still images 13 to 16, respectively. In the automatic print setting files 19 to 22, the descriptions "PRT PID=001" and "PRT PID=002" denote JOB numbers, while the description "PRT PID=STD" denotes output of one digital still image to one recording paper sheet. Meanwhile, the descriptions "PRT QTY=1" and "PRT QTY=3" denote a print quantity of one sheet and a print quantity of three sheets, respectively, while the description "IMG FMT=EXIF2-J" designates a recording format of the images. Furthermore, the description <IMG SRC="../DCIM/100CDPFP/IMGA0001.JPG"> of the automatic print setting file 19 designates the digital still image 13, the description <IMG SRC="../DCIM/100CDPFP/IMGA0002.JPG"> of the automatic print setting file 20 designates the digital still image 14, the description <IMG SRC="../DCIM/100CDPFP/IMGA0003.JPG"> of the automatic print setting file 21 designates the digital still image 15 and the description <IMG SRC="../DCIM/100CDPFP/IMGA0004.JPG"> of the automatic print setting file 22 designates the digital still image 16.

Therefore, the automatic print setting file 19 corresponds to the digital still image 13 and sets a print quantity of the digital still image 13 to one, the automatic print setting file 20 corresponds to the digital still image 14 and sets a print quantity of the digital still image 14 to one, the automatic print setting file 21 corresponds to the digital still image 15 and sets a print quantity of the digital still image 15 to three and the automatic print setting file 22 corresponds to the digital still image 16 and sets a print quantity of the digital still image 16 to one. Since the first mode of the automatic print is performed in accordance with the automatic print setting files 19 to 22, the procedure of the first embodiment in which the operator displays the digital still images 13 to 18 of the memory card 1 on the display unit 25 so as to select the digital still images to be printed is not required to be performed, so that the display unit 25 is not provided.

In this automatic print, power is supplied to the power source 3 from the battery, while the digital still images 13 to 18 and the automatic print setting files 19 to 22 are recorded in the memory card 1. Therefore, in the automatic print, one print of each of the digital still images 13 and 14, three prints of the digital still image 15 and one print of the digital still image 16 are outputted in accordance with the automatic print setting files 19 to 22, respectively. Initially, the operator operates the operating unit 5 so as to turn on the power source 3 by the battery via the control unit 4. Then, the control unit 4 detects that the memory card 1 is connected to the memory card control unit 2. In this state, the automatic print for outputting one print of each of the digital still images 13 and 14, three prints of the digital still image 15 and one print of the digital still image 16 is started in accordance with the automatic print setting files 19 to 22, respectively. The control unit 4 detects remainder of a battery capacity each time one print of each digital still image has been outputted. During the automatic print, in case the control unit 4 has judged, by detecting the remainder of the battery capacity upon completion of output of one print of each of the digital still images 13 and 14 and one print of the digital still image 15, that the remainder of the battery capacity is insufficient for outputting the remaining prints, the control unit 4 stores in the nonvolatile memory 9 the information on the automatic print records that output of the one print of each of the digital still images 13 and 14 has been completed (i.e., "the number of the digital still images whose prints of the designated print quantities have been outputted=2") and output of the one print of the digital still image 15 has been completed (i.e., "the number of outputted prints of the digital still image whose prints of the designated print quantity have not been outputted=1") and the recording medium information of the memory card 1. The recording medium information of the memory card 1 includes the remaining capacity of the memory card 1, for example, "4 Mbytes", the number of the digital still images recorded in the memory card 1, for example, "6", a file name of at least one digital still image recorded in the memory card 1, for example, "IMGA0001.JPG" of the digital still image 13, information on a file size of at least one digital still image recorded in the memory card 1, for example, "700 Kbytes" and information on file sizes of the automatic print setting files 19 to 22 recorded in the memory card 1, for example, "10 Kbytes".

Then, the control unit 4 turns off the power source 3. Subsequently, when the printing apparatus K2 has been reinstated to a state enabling printing by turning on the power source 3 by an AC adapter or the recharged battery, the comparator 10 compares the recording medium information of the memory card 1 with the recording medium information stored in the nonvolatile memory 9 so as to detect whether or not they are coincident with each other.

In case the recording medium information of the memory card 1 is coincident with the recording medium information recorded in the nonvolatile memory 9, it is judged from the information on the automatic print records of "the number of the digital still images whose prints of the designated print quantities have been outputted=2" and "the number of outputted prints of the digital still image whose prints of the designated print quantity have not been outputted=1" that output of one print of each of the digital still images 13 and 14 has been completed and output of one print of the digital still image 15 has been completed. Hence, in response to a command for outputting the remaining two prints of the digital still image 15, the memory card control unit 2 reads the digital still image 15 from the memory card 1 so as to expand the digital still image 15 into image information and the control unit 4 stores the image information in the image memory 6. Then, the print engine 7 supplies to the thermal head 8 the image information stored in the image memory 6 and the remaining two prints of the digital still image 15 are outputted by the thermal head 8. Subsequently, in response to a command for outputting the one print of the digital still image 16, the one print of the digital still image 16 is outputted by the thermal head 8 in the same manner as the digital still image 15. Thus, output of the one print of each of the digital still images 13 and 14, the three print of the digital still image 15 and the one print of the digital still image 16 has been completed.

On the other hand, in case the recording medium information of the memory card 1 is not coincident with the recording medium information recorded in the nonvolatile memory 9, the control unit 4 issues, in accordance with the automatic print setting files 19 to 22, respectively, a first command for outputting one print of the digital still image 13, a second command for outputting one print of the digital still image 14, a third command for outputting three prints of the digital still image 15 and a fourth command for outputting one print of the digital still image 16. In response to the first command, the memory card control unit 2 reads the digital still image 13 from the memory card 1 so as to expand the digital still image 13 into image information and the control unit 4 stores the image information in the image memory 6. Then, the print engine 7 supplies to the thermal head 8 the image information stored in the image memory 6 and one print of the digital still image 13 is outputted by the thermal head 8. Subsequently, if the control unit 4 has detected that remainder of a battery capacity enables printing, the control unit 4 confirms that the designated one print of the digital still image 13 has been outputted. Then, in response to the second command, the memory card control unit 2 reads the digital still image 14 from the memory card 1 so as to expand the digital still image 14 into image information such that the designated one print of the digital still image 14 is outputted in the same manner as the digital still image 13. Subsequently, in response to the third and fourth commands, the designated three prints of the digital still image 15 and the designated one print of the digital still image 16 are, respectively, outputted in the same manner as the digital still image 14. Thus, output of the one print of each of the digital still images 13 and 14, the three print of the digital still image 15 and the one print of the digital still image 16 has been completed.

Thereafter, in the nonvolatile memory 9, the recording medium information and the information on the automatic print records are cleared. Consequently, the print output commands of the control unit 4 have been executed and the operating unit 5 is set in a waiting state.

Hereinafter, the second mode of the automatic print of the printing apparatus K2 is described with reference to FIGS. 2 and 3. In the first mode, the automatic print setting files 19 to 22 of FIG. 4 are recorded in the memory card 1. On the other hand, in the second mode, power is supplied to the power source 3 from a battery, the digital still images 13 to 18 are recorded in the memory card 1 but the automatic print setting files 19 to 22 are not recorded in the memory card 1 in the same manner as the first embodiment. Initially, an operator operates the operating unit 5 so as to turn on the power source 3 by the battery via the control unit 4. Then, the control unit 4 detects that the memory card 1 is connected to the memory card control unit 2. In this state, the operator sets, by operating the operating unit 5, the automatic print for outputting one print of each of all the digital still images 13 to 18 recorded in the memory card 1 so as to start the automatic print.

The control unit 4 detects remainder of a battery capacity each time one print of each digital still image has been outputted. During the automatic print, in case the control unit 4 has judged, by detecting the remainder of the battery capacity upon completion of output of one print of each of the digital still images 13 to 15, that the remainder of the battery capacity is insufficient for outputting the remaining prints, the control unit 4 stores in the nonvolatile memory 9 the information on the automatic print records of "the number of the digital still images whose prints of the designated print quantities have been outputted=3" and "the number of outputted prints of the digital still image whose prints of the designated print quantity have not been outputted=0" and the recording medium information of the memory card 1. The recording medium information of the memory card 1 includes the remaining capacity of the memory card 1, for example, "4 Mbytes", the number of the digital still images recorded in the memory card 1, for example, "6", a file name of at least one digital still image recorded in the memory card 1, for example, "IMGA0001.JPG" of the digital still image 13, information on a file size of at least one digital still image recorded in the memory card 1, for example, "700 Kbytes" and information on file sizes of the automatic print setting files 19 to 22 recorded in the memory card 1, for example, "0 byte".

Then, the control unit 4 turns off the power source 3. Subsequently, when the printing apparatus K2 has been reinstated to a state enabling printing by turning on the power source 3 by an AC adapter or the recharged battery, the comparator 10 compares the recording medium information of the memory card 1 with the recording medium information stored in the nonvolatile memory 9 so as to detect whether or not they are coincident with each other.

In case the recording medium information of the memory card 1 is coincident with the recording medium information recorded in the nonvolatile memory 9, it is judged from the information on the automatic print records of "the number of the digital still images whose prints of the designated print quantities have been outputted=3" and "the number of outputted prints of the digital still image whose prints of the designated print quantity have not been outputted=0" that output of one print of each of the digital still images 13 to 15 has been completed. Hence, in response to a command for outputting one print of the digital still image 16, the memory card control unit 2 reads the digital still image 16 from the memory card 1 so as to expand the digital still image 16 into image information and the control unit 4 stores the image information in the image memory 6. Then, the print engine 7 supplies to the thermal head 8 the image information stored in the image memory 6 and the one print of the digital still image 16 is outputted by the thermal head 8. Subsequently, in the same manner as the digital still image 16, the one print of each of the digital still images 17 and 18 is outputted by the thermal head 8. Thus, output of the one print of each of the digital still images 13 to 18 has been completed.

On the other hand, in case the recording medium information of the memory card 1 is not coincident with the recording medium information recorded in the nonvolatile memory 9, the control unit 4 issues first to sixth commands for outputting one print of each of the digital still images 13 to 18, respectively. In response to the first command, the memory card control unit 2 reads the digital still image 13 from the memory card 1 so as to expand the digital still image 13 into image information and the control unit 4 stores the image information in the image memory 6. Then, the print engine 7 supplies to the thermal head 8 the image information stored in the image memory 6 and one print of the digital still image 13 is outputted by the thermal head 8. Subsequently, if the control unit 4 has detected that remainder of a battery capacity enables printing, the control unit 4 confirms that the designated one print of the digital still image 13 has been outputted. Then, in response to the second to sixth commands, the designated one print of each of the digital still images 14 to 18 is outputted in the same manner as the digital still image 13. Thus, output of the one print of each of the digital still images 13 to 18 has been completed.

Thereafter, in the nonvolatile memory 9, the recording medium information and the information on the automatic print records are cleared. Consequently, the print output commands of the control unit 4 have been executed and the operating unit 5 is set in a waiting state.

Hereinafter, the third mode of the automatic print of the printing apparatus K2 is described with reference to FIGS. 2 to 4. The printing apparatus K2 is changed over by the control unit 4 to a first state in which in the same manner as the first mode of the automatic print, the digital still images 13 to 16 are, respectively, printed in accordance with the automatic print setting files 19 to 22 when power is supplied to the power source 3 from a battery and the digital still images 13 to 18 and the automatic print setting files 19 to 22 are recorded in the memory card 1 and a second state in which in the same manner as the second mode of the automatic print, one print of each of all the digital still images 13 to 18 recorded in the memory card 1 is outputted when power is supplied to the power source 3 from a battery and only the digital still images 13 to 18 are recorded in the memory card 1.

In the first state of the third mode of the automatic print, printing operation is performed in the same manner as the first mode of the automatic print. The recording medium information of the memory card 1 includes the remaining capacity of the memory card 1, for example, "4 Mbytes", the number of the digital still images recorded in the memory card 1, for example, "6", a file name of at least one digital still image recorded in the memory card 1, for example, "IMGA0001.JPG" of the digital still image 13, information on a file size of at least one digital still image recorded in the memory card 1, for example, "700 Kbytes" and information on file sizes of the automatic print setting files 19 to 22 recorded in the memory card 1, for example, "1 Kbyte". Since other points of the printing operation in the first state of the third mode of the automatic print is the same as those of the printing operation of the first mode of the automatic print, the description is abbreviated for the sake of brevity.

Meanwhile, since printing operation in the second state of the third mode of the automatic print is performed in the same manner as the second mode of the automatic print, the description is abbreviated for the sake of brevity.

In the second embodiment, the following effects can be achieved.

Namely, in the first mode of the automatic print, the printing apparatus K2 does not include the display unit 25 for displaying the digital still images recorded in the memory card 1 and performs printing on the basis of the automatic print setting files recorded in the memory card 1. If power is supplied to the power source 3 from the battery and the control unit 4 has detected that the battery will run down during printing, the information on the automatic print records and the recording medium information of the memory card 1 are recorded in the nonvolatile memory 9 and then, the power source 3 is turned off. Therefore, if it is detected, after the power source 3 has been turned on again, whether or not the recording medium information of the memory card 1 recorded in the nonvolatile memory 9 is coincident with the recording medium information of the memory card 1 read by the memory card control unit 2 after turning on of the power source 3 again, it is possible to confirm whether or not contents of the memory card 1 prior to turning on of the power source 3 again are identical with those after turning on of the power source 3 again. Furthermore, by using the information on the automatic print records recorded in the nonvolatile memory 9, the printing operation is continued on the basis of the automatic print setting files subsequently to a printing stage attained immediately prior to turning off of the power source 3, without the need for performing special operations. Meanwhile, when the control unit 4 has detected that the battery will run down during printing, the information on the automatic print records and the recording medium information of the memory card 1 are recorded in the nonvolatile memory 9 and then, the power source 3 is turned off, so that it is possible to positively inform the operator of a risk that the battery will run down. Consequently, desired automatic print can be performed positively by preventing erroneous automatic print.

Meanwhile, in the second mode of the automatic print, the printing apparatus K2 does not include the display unit 25 for displaying the digital still images recorded in the memory card 1 and performs printing of all the digital still images recorded in the memory card 1 storing no automatic print setting file. If power is supplied to the power source 3 from the battery and the control unit 4 has detected that the battery will run down during printing, the information on the automatic print records and the recording medium information of the memory card 1 are recorded in the nonvolatile memory 9 and then, the power source 3 is turned off. Therefore, if it is detected, after the power source 3 has been turned on again, whether or not the recording medium information of the memory card 1 recorded in the nonvolatile memory 9 is coincident with the recording medium information of the memory card 1 read by the memory card control unit 2 after turning on of the power source 3 again, it is possible to confirm whether or not contents of the memory card 1 prior to turning on of the power source 3 again are identical with those after turning on of the power source 3 again. Furthermore, by using the information on the automatic print records recorded in the nonvolatile memory 9, the printing operation is continued subsequently to a printing stage attained immediately prior to turning off of the power source 3, without the need for performing special operations, so that all the digital still images recorded in the memory card 1 are printed. Meanwhile, when the control unit 4 has detected that the battery will run down during printing, the information on the automatic print records and the recording medium information of the memory card 1 are recorded in the nonvolatile memory 9 and then, the power source 3 is turned off, so that it is possible to positively inform the operator of a risk that the battery will run down. Consequently, desired automatic print can be performed positively by preventing erroneous automatic print.

Furthermore, in the third mode of the automatic print, the printing apparatus K2 does not include the display unit 25 for displaying the digital still images recorded in the memory card 1 and is changed over to the first state for printing the digital still images 13 to 16 on the basis of the automatic print setting files 19 to 22, respectively by reading the memory card 1 storing the automatic print setting files 19 to 22 and the second state for printing, by reading the memory card 1 storing no automatic print setting file, all the digital still images 13 to 18 recorded in the memory card 1. If power is supplied to the power source 3 from the battery and the control unit 4 has detected that the battery will run down during printing, the information on the automatic print records and the recording medium information of the memory card 1 are recorded in the nonvolatile memory 9 and then, the power source 3 is turned off. Therefore, if it is detected, after the power source 3 has been turned on again, whether or not the recording medium information of the memory card 1 recorded in the nonvolatile memory 9 is coincident with the recording medium information of the memory card 1 read by the memory card control unit 2 after turning on of the power source 3 again, it is possible to confirm whether or not contents of the memory card 1 prior to turning on of the power source 3 again are identical with those after turning on of the power source 3 again. Furthermore, irrespective of whether the printing apparatus K2 is in the first state or the second state, the printing operation is continued, by using the information on the automatic print records recorded in the nonvolatile memory 9, subsequently to a printing stage attained immediately prior to turning off of the power source 3, without the need for performing special operations. Meanwhile, when the control unit 4 has detected that the battery will run down during printing, the information on the automatic print records and the recording medium information of the memory card 1 are recorded in the nonvolatile memory 9 and then, the power source 3 is turned off, so that it is possible to positively inform the operator of a risk that the battery will run down. Consequently, desired automatic print can be performed positively by preventing erroneous automatic print.

In the above embodiments, detection of the remainder of the battery capacity by the control unit 4 is performed immediately after output of a specific one of prints of one of the digital still images but may also be performed at each step for outputting each print of the digital still images.

Meanwhile, in the above embodiments, when the control unit 4 has judged, by detecting the remainder of the battery capacity, that the remainder of the battery capacity is insufficient for outputting the remaining prints, the control unit 4 stores the information on the automatic print records and the recording medium information of the memory card 1 in the nonvolatile memory 9 and then, turns off the power source 3. However, the power source 3 may also be set in a waiting state without being turned off positively.

Furthermore, in the above embodiments, in case the control unit 4 has judged, by detecting the remainder of the battery capacity, that the remainder of the battery capacity is insufficient for outputting the remaining prints, the control unit 4 stores in the nonvolatile memory 9 the recording medium information of the memory card 1, which includes five items, i.e., the remaining capacity of the memory card 1, the number of the digital still images recorded in the memory card 1, a file name of at least one digital still image recorded in the memory card 1, information on a file size of at least one digital still image recorded in the memory card 1 and information on file sizes of the automatic print setting files recorded in the memory card 1. However, one or not less than two of the above five items may be stored, as the recording medium information, in the nonvolatile memory 9.

Moreover, in the above embodiments, when the control unit 4 has judged, by detecting the remainder of the battery capacity, that the remainder of the battery capacity is insufficient for outputting the remaining prints, the control unit 4 stores the information on the automatic print records and the recording medium information of the memory card 1 in the nonvolatile memory 9 and then, turns off the power source 3. However, alternatively, in case the operator turns off the power source 3 in the course of output of each print, the power source 3 may be turned off after the control unit 4 has stored the information on the automatic print records and the recording medium information of the memory card 1 in the nonvolatile memory 9. As a result, after the power source has been turned on again, the operator can confirm that contents of the memory card prior to turning on of the power source again are identical with those of the memory card after turning on of the power source again and the printing operation is continued subsequently to a printing stage attained immediately prior to turning off of the power source.

In addition, in the above embodiments, when the control unit 4 has judged, by detecting the remainder of the battery capacity, that the remainder of the battery capacity is insufficient for outputting the remaining prints, the control unit 4 stores the information on the automatic print records and the recording medium information of the memory card 1 in the nonvolatile memory 9 and then, turns off the power source 3. However, this procedure may also be applied to timer management in which the power source 3 is turned off upon lapse of a predetermined period from a time point of detection that printing is impossible due to absence of a recording paper sheet to be printed or ink. Alternatively, the power source may be turned off after the control unit 4 has stored the information on the automatic print records and the recording medium information of the memory card 1 in the nonvolatile memory 9 upon lapse of a predetermined period from a time point of detection that printing is impossible due to absence of a recording paper sheet to be printed or ink and then, turns off the power source 3.

As is clear from the foregoing description, in the present invention, even if automatic print is interrupted by shortage of the battery capacity or turning off of the power source during the automatic print, the automatic print can be continued subsequently to a printing stage attained at the time of interruption of the automatic print when the printing apparatus has been reinstated to a state enabling printing by turning on the power source by an AC adapter or the recharged battery. Therefore, it is possible to gain such an excellent effect that even when in OFF state of the power source of the printing apparatus, the image data or the automatic print setting files recorded in the memory card have been changed or erased or the memory card has been replaced by a different memory card, desired automatic print can be performed positively by preventing erroneous automatic print.

What is claimed is:

1. A printing apparatus comprising:

a recording medium read-out means for reading from a recording medium for recording image data to be printed, the image data;

a print control means for giving a print command for printing the image data recorded in the recording medium; and a recording means for recording information on automatic print records, indicative of, in the image data designated by the print command of the print control means, the number of images whose prints of quantities designated by the print command of the print control means have been outputted and the number of outputted prints of an image whose prints of a quantity designated by the print command of the print control means have not been outputted;

wherein when the print control means has detected that a battery for a power source will run down during printing, the information on the automatic print records is recorded in the recording means and then, the print control means gives, after turning on of the power source again, a further print command for continuously printing, in accordance with the information on the automatic print records recorded in the recording means, the image data designated by the print command given prior to turning on of the power source again.

2. A printing apparatus comprising:

a recording medium read-out means for reading from a recording medium for recording image data to be printed and recording medium information indicative of a state of the recording medium, the image data and the recording medium information;

a print control means for giving a print command for printing the image data recorded in the recording medium;

a recording means for recording the recording medium information of the recording medium and information on automatic print records, indicative of, in the image data designated by the print command of the print control means, the number of images whose prints of quantities designated by the print command of the print control means have been outputted and the number of outputted prints of an image whose prints of a quantity designated by the print command of the print control means have not been outputted; and a comparator;

wherein when the print control means has detected that a battery for a power source will run down during printing, the recording medium information and the information on the automatic print records are recorded in the recording means and then, the comparator compares, after turning on of the power source again, the recording medium information recorded in the recording means, with the recording medium information read from the recording medium by the recording medium read-out means after turning on of the power source again so as to detect whether or not the recording medium information recorded in the recording means is coincident with the recording medium information of the recording medium;

wherein when the comparator has detected that the recording medium information recorded in the recording means is coincident with the recording medium information of the recording medium, the print control means gives a further print command for continuously printing, in accordance with the information on the automatic print records recorded in the recording means, the image data designated by the print command given prior to turning on of the power source again.

3. A printing apparatus as claimed in claim 1, wherein the print control means selects a portion from all the image data recorded in the recording medium so as to print the portion.

4. A printing apparatus as claimed in claim 2, wherein the print control means performs automatic print of the image data in accordance with automatic print setting files for setting the image data to be printed and print quantities of the image data to be printed, with the automatic print setting files being recorded in the recording medium together with the image data.

5. A printing apparatus as claimed in claim 2, wherein the print control means performs automatic print of all the image data recorded in the recording medium.

6. A printing apparatus as claimed in claim 2, wherein in case automatic print setting files for setting the image data to be printed and print quantities of the image data to be printed are present in the recording medium, the print control means performs automatic print of the image data in accordance with the automatic print setting files;

wherein in case the automatic print setting files are not present in the recording medium, the print control means performs automatic print of all the image data recorded in the recording medium.

7. A printing apparatus as claimed in claim 2, wherein the recording medium information is a remaining capacity of the recording medium.

8. A printing apparatus as claimed in claim 2, wherein the recording medium information is the number of images in the image data recorded in the recording medium.

9. A printing apparatus as claimed in claim 2, wherein the recording medium information is a file name of at least one image in the image data recorded in the recording medium.

10. A printing apparatus as claimed in claim 2, wherein the recording medium information is information on a file size of at least one image in the image data recorded in the recording medium.

11. A printing apparatus as claimed in claim 2, wherein the recording medium information is information on file sizes of automatic print setting files recorded in the recording medium, for setting the image data to be printed and print quantities of the image data to be printed.

12. A printing apparatus as claimed in claim 2, wherein the recording medium information includes at least two of a remaining capacity of the recording medium, the number of images in the image data recorded in the recording medium, a file name of at least one image in the image data recorded in the recording medium, information on a file size of at least one image in the image data recorded in the recording medium and information on file sizes of automatic print setting files recorded in the recording medium, for setting the image data to be printed and print quantities of the image data to be printed.

13. A printing apparatus as claimed in claim 2, wherein when an operator turns off the power source, the recording medium information and the information on the automatic print records are recorded in the recording means.

14. A printing apparatus as claimed in claim 2, wherein when the power source is turned off automatically by timer management or drop of a remainder of a battery capacity, the recording medium information and the information on the automatic print records are recorded in the recording means.

* * * * *